(12) United States Patent
Wang et al.

(10) Patent No.: US 8,745,042 B2
(45) Date of Patent: Jun. 3, 2014

(54) DETERMINING MATCHING DEGREES BETWEEN INFORMATION CATEGORIES AND DISPLAYED INFORMATION

(75) Inventors: Chang Wang, Hangzhou (CN); Hui Huang, Hangzhou (CN); Jian Shi, Hangzhou (CN); Feng Xie, Hangzhou (CN); Maojian Fu, Hangzhou (CN); Gang Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 196 days.

(21) Appl. No.: 13/484,049

(22) Filed: May 30, 2012

(65) Prior Publication Data

US 2012/0310932 A1    Dec. 6, 2012

(30) Foreign Application Priority Data

Jun. 3, 2011    (CN) .......................... 2011 1 0149832

(51) Int. Cl.
*G06F 17/30* (2006.01)
(52) U.S. Cl.
USPC ............................ 707/723; 707/758; 707/768
(58) Field of Classification Search
USPC .................. 707/758, 768, 784, 748, E17.112, 707/999.007, 999.107, 723, 731
See application file for complete search history.

(56) References Cited

U.S. PATENT DOCUMENTS

| 5,446,891 | A | * | 8/1995 | Kaplan et al. ........................ 1/1 |
| 6,618,722 | B1 | * | 9/2003 | Johnson et al. ..................... 1/1 |
| 7,617,193 | B2 | * | 11/2009 | Bitan et al. .......................... 1/1 |
| 2004/0181525 | A1 | | 9/2004 | Itzhak et al. |
| 2006/0095370 | A1 | | 5/2006 | Seth et al. |
| 2008/0021878 | A1 | | 1/2008 | Jeong |
| 2010/0070339 | A1 | | 3/2010 | Bae et al. |
| 2010/0185610 | A1 | * | 7/2010 | Lunt et al. ..................... 707/727 |
| 2011/0296463 | A1 | * | 12/2011 | Suslov ............................. 725/44 |
| 2012/0036119 | A1 | * | 2/2012 | Zwicky et al. ................ 707/711 |
| 2012/0095979 | A1 | * | 4/2012 | Aftab et al. ................... 707/706 |
| 2012/0233178 | A1 | * | 9/2012 | Oztekin et al. ................ 707/748 |
| 2012/0278317 | A1 | * | 11/2012 | Spiegel ......................... 707/731 |
| 2014/0025484 | A1 | * | 1/2014 | Altberg et al. ............. 705/14.45 |

OTHER PUBLICATIONS

Xianyong Fang et al: "Visualization of the Search Results of the Semantic Web Search Engines", Proceedings of the Poster and Demonstration Session at the 7th International Semantic Web Conference (ISWC2008), Oct. 28, 2010, XP55038613, Karlsruhe, Germany Retrieved from the Internet: URL:http://www4.wiwiss.fu-berlin.de/bizer/pub/iswc2008pd-bak/iswc2008pd_submission_6.pdf.

Thorsten Joachims: "Optimizing search engines using clickthrough data", Proceedings of the Eighth ACM SIGKDD International Conference on Knowledge Discovery and Data Mining, KDD '02, Jan. 1, 2002, p. 133, XP55038616, New York, New York, USA DOI: 10-1145/775047.775067 ISBN: 978-1-58-113567-1 sections 1 and 2.

* cited by examiner

*Primary Examiner* — Leslie Wong
(74) *Attorney, Agent, or Firm* — Van Pelt, Yi & James LLP (57) ABSTRACT

Determining matching degrees of information categories and displayed information is disclosed. In some embodiments, recorded user selection action information with respect to displayed information is analyzed to determine which pieces of displayed information have been selected and which pieces were displayed but not selected. In some embodiments, a matching degree for an information category is determined based on the recorded user selection information with respect to displayed information. In some embodiments, based on this matching degree determined for the information category, it is determined whether the information to be displayed for the information category is to be adjusted for a subsequent event in which information of the information category is to be displayed.

19 Claims, 5 Drawing Sheets

DETERMINING MATCHING DEGREES BETWEEN INFORMATION CATEGORIES AND DISPLAYED INFORMATION

CROSS REFERENCE TO OTHER APPLICATIONS

This application claims priority to People's Republic of China Patent Application No. 201110149832.6 entitled INFORMATION ADJUSTMENT METHOD AND DEVICE filed Jun. 3, 2011 which is incorporated herein by reference for all purposes.

FIELD OF THE INVENTION

This application involves the field of internet technology. In particular, it involves a technique for adjusting category specific information to be displayed to users.

BACKGROUND OF THE INVENTION

Online information is typically displayed for a user in response to a keyword search conducted by the user or simply as recommendations of possible interest to the user. Conventionally, what is displayed from one or more categories of information for a user and how well it aligns with the user's interest is typically determined based on statistical user click action information. For example, user click action information with respect to information obtained through keyword searches and/or with displayed information obtained for other reasons may be recorded and statistical analysis may be performed on such information. Pieces of information may refer to content such as audio files, language, text, graphic images, animation and/or other types of media, while an information category may be thought of as a common attribute possessed by multiple pieces of information. For example, a common attribute possessed by the text information "tops," "dresses," "shorts," and "pants" can be "clothing" and so the information category of such information may be "clothing." In another example, a common attribute possessed by images that depict mountains, images that depict oceans, and other such image information can be "scenery" and so the information category of such information may be "scenery." Generally, in the search field (e.g., of a search engine), entered keywords may be viewed as related to information categories, and the pieces of information obtained based on keyword searches may be information that are actually included in the information categories that match the keyword(s) of the search. For example, "Hilton Hotel," "Shangri-la Hotel," and "Grand Hotel Beijing," which are at least some pieces of information organized under the information category of "hotels" may be obtained based on a search for the keyword "hotel" or "hotels."

Determining the correlation between pieces of information and the information categories under which they are organized plays an important role in determining keyword search hit rates, determining information ranking/display accuracy rates, and adjusting which pieces of information are to be displayed for information categories (e.g., a piece of information that has a low correlation with the information category may be deleted from that category).

As mentioned above, the typical statistical analysis used to determine the correlation between pieces of information and information categories is generally based on user click action information. However, such statistical analysis overlooks the distinction between pieces of information that were displayed and selected (e.g., by one or more users) and pieces of information that were displayed but not selected. Ignoring such a distinction could contribute to lower accuracy of the correlation of information that is determined.

As a result of the low accuracy of the determined correlations, keyword search hit rates, information ranking/display accuracy rates, and determining adjustment of information are also less accurate, which leads to a waste of resources.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Determining matching degrees between information categories and displayed information is described herein. In various embodiments, various pieces of information are predetermined to be included in each of various information categories. For example, pieces of information may include text (e.g., product information, descriptions of things/places) and any type of media (e.g., images, video, audio) files. For example, in response to a keyword-based search by a user, at least a subset of the pieces of information included in the information category(ies) that match the keyword(s) of the search query are displayed for the user. In some embodiments, at least a subset of pieces of information included in a particular information category is configured to be displayed in response to the determination to display information from that category (e.g., when in a matching keyword-based search, the query keyword matches that category). The remaining pieces of information of the particular information category (that are not configured to display in response to the determination to display information from that category) are not displayed in response to the determination to display information from that category. As used herein, how well the at least subset of information designated to be displayed for an information category represents and/or relates to user's interests is referred to as a "matching degree." A higher matching degree indicates that the subset of information to be displayed for a particular information category is more relevant to a user's interests and a lower matching degree indicates that the subset of information to be displayed is less relevant to user's interests. In various embodiments, a matching degree is determined for an information category and its associated pieces of displayed information, where the matching degree takes into account whether a piece of information has been historically displayed and selected or historically displayed but not selected. In some embodiments, if the matching degree determined for a particular information category is below a threshold, then the subset of the information category's associated pieces of information to be displayed is adjusted such that the subset of information to be displayed for the information category next time includes at least one modification (e.g., a piece of information that was not previously displayed, a new piece of information, a deletion of a piece of information). As such, the determined matching degree for an information category and its current subset of displayed information may be used to determine whether an adjustment needs to be made to the information that is displayed for the category. By adjusting the information to be displayed for the information category, it may be possible to obtain a higher matching degree for the information category than before the adjustment.

Figure 1:
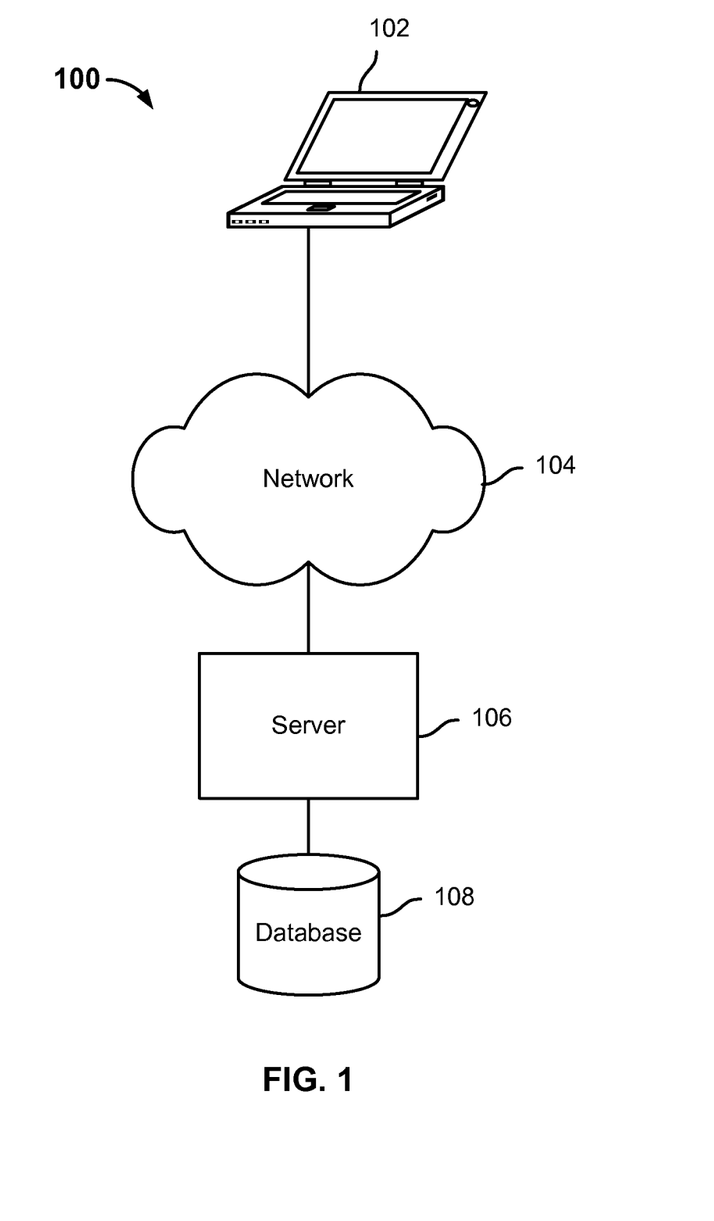
FIG. 1 is a diagram showing an embodiment of a system for determining matching degrees between information categories and displayed information.

FIG. 1 is a diagram showing an embodiment of a system for determining matching degrees between information categories and displayed information. In the example, system 100 includes client 102, network 104, server 106, and database 108. Network 104 may include various high-speed data networks and/or telecommunications networks.

Client 102 is configured to present to a user at client 102 one or more pieces of displayed information at a website. For example, a web browser application may be installed at client 102 to enable a user to access a search engine at which the user may perform keyword-based searches to which pieces of information are displayed in response to the searches. Which pieces of displayed information are actually selected by the user is also recorded by an application at client 102, at server 106, or both, which are configured to provide the displayed information. For example, a user may select (e.g., by using a cursor to click on) a piece of information that he or she is interested in among the search results. By clicking on the piece of information, the user may be directed to a webpage and/or a further description associated with the content of the selected piece of information. While client 102 is shown to be a laptop computer, client 102 may also be a desktop computer, a smart phone, a mobile device, and/or any other type of computing device.

In some embodiments, database 108 is configured to store the recorded user selection action information with respect to the displayed information. In some embodiments, database 108 is also configured to store pieces of information and the respective information categories under which they are organized. In some embodiments, database 108 is also configured to denote which subset of the pieces of information included in a particular information category is to be displayed when there is a need to display information from that category and which other pieces of information included in the particular information category is not to be displayed when there is a need to display information from that category.

Server 106 is configured to analyze the recorded user selection action information with respect to the displayed information to determine matching degrees for one or more information categories and their respective displayed information. As will be discussed further below, server 106 is configured to determine several values such as a first primitive weighting, a second primitive weighting, a first correspondence weighting, and a second correspondence weighting for each information category based on the category's corresponding pieces of displayed and selected information, and also pieces of displayed but not selected information. Server 106 is configured to use such determined values for an information category to determine a matching degree for that information category and its current subset of pieces of information to be displayed. In some embodiments, in the event the matching degree is below a predetermined threshold, then the subset of pieces of information to be displayed for that category is adjusted and in the event the matching degree is equal to or above a predetermined threshold, then the subset of pieces of information to be displayed for that category is not adjusted.

Figure 2:
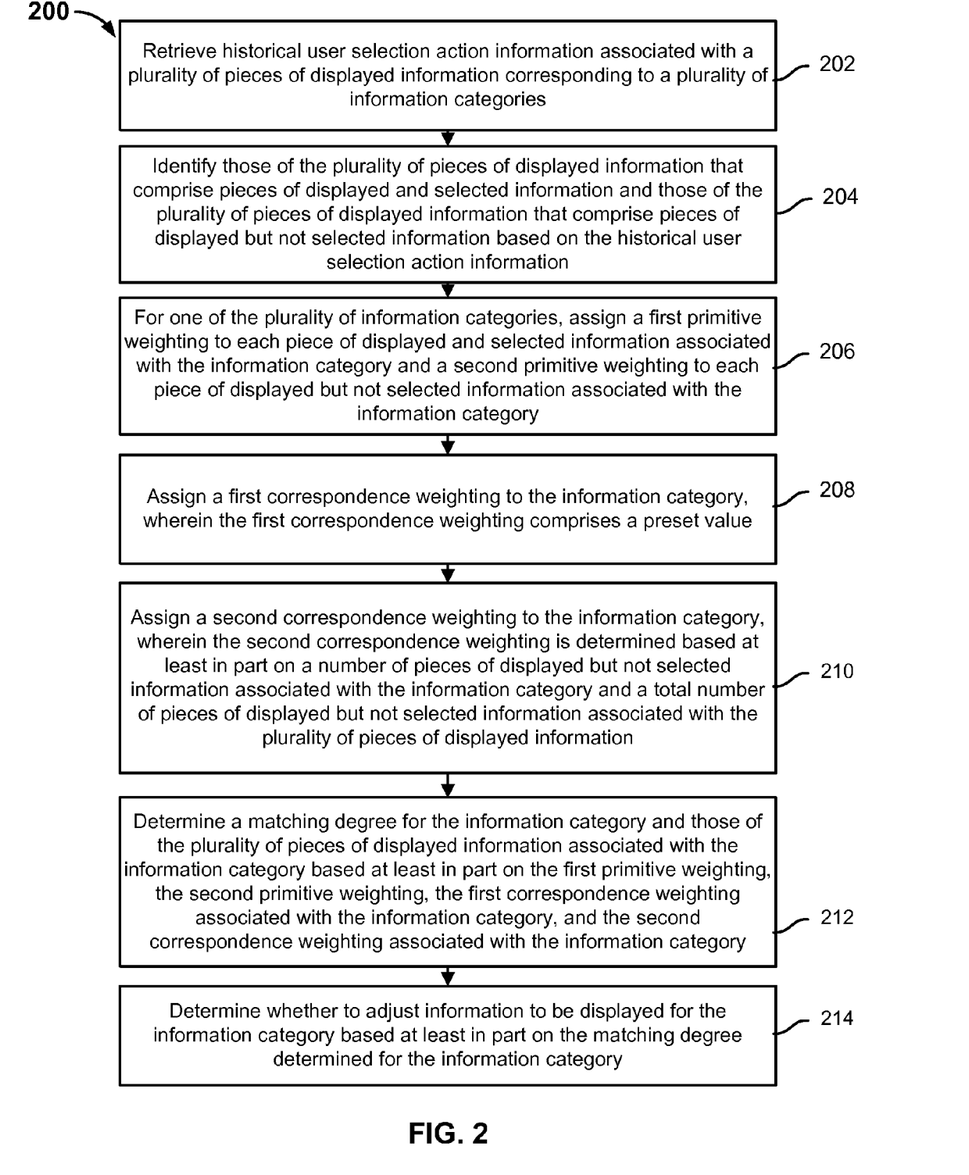
FIG. 2 is a diagram showing an embodiment of a process for determining matching degrees between information categories and displayed information.

FIG. 2 is a diagram showing an embodiment of a process for determining matching degrees between information categories and displayed information. In some embodiments, process 200 is implemented at system 100.

Process 200 may be used to determine matching degrees between information categories and the subsets of information that are configured to be displayed for them. Matching degrees are determined based on analyzing historical user selection information with respect to displayed information, including which of such displayed information has actually been selected by a user and which of such displayed information has not been. In some embodiments, the determined matching degree for an information category and its subset of pieces of information that are to be displayed for the information category is used to determine whether such information to be displayed for the information category should be adjusted for the subsequent event that information included in the category is to be displayed. Process 200 may be repeated periodically based on updated historical user selection information with respect to displayed information to determine whether the subset of information currently configured to be displayed for an information category should be adjusted.

At 202, historical user selection action information associated with a plurality of pieces of displayed information corresponding to a plurality of information categories is retrieved. In some embodiments, logs of user actions with respect to displayed information are recorded. For example, a log may indicate one or more pieces of information that were displayed, the information category(ies) to which each piece of displayed information belongs, which pieces of displayed information were selected by a user (e.g., which pieces of information that a user has clicked on as an indication of interest), and a time at which the information was displayed. Such recorded logs (e.g., associated with a particular time period) may be retrieved from storage and used to analyze matching degrees for information categories and their respective pieces of information that were displayed. For example, the longer the time period from which the logs are retrieved, the more information there is to analyze and thus, the more accurate the matching degrees may be determined. Examples of events in which the pieces of information may be displayed include being displayed by a search engine in response to a user's keyword-based search or chosen to be displayed for users by a website operator.

At 204, those of the plurality of pieces of displayed information that comprise pieces of displayed and selected information and those of the plurality of pieces of displayed information that comprise pieces of displayed but not selected information are identified based on the historical selection action information. Based on the retrieved logs, it can be determined which of the pieces of displayed information were pieces of information that had been selected and which had not been. It can be assumed that those pieces of displayed and selected information were selected by users because they better reflected the users' interests.

206-214 are performed for one information category and may be repeated for each information category that is associated with the plurality of pieces of displayed information extracted from the logs:

At 206, a first primitive weighting is assigned to each piece of displayed and selected information associated with the information category and a second primitive weighting is assigned to each piece of displayed but not selected information associated with the information category.

In some embodiments, initially, the total number of pieces of displayed and selected information is determined and the total number of pieces of displayed but not selected information is also determined. In some embodiments, the first primitive weighting may be determined based on the ratio of the total number of pieces of displayed and selected information to the total number of pieces of displayed information. Every piece of displayed information in any information category that was selected is assigned the same, first primitive weighting. In some embodiments, the second primitive weighting may be determined based on the ratio of the number of pieces of displayed but not selected information to the total number of pieces of displayed information. Every piece of displayed information in any information category that was not selected is assigned the same, second primitive weighting.

For example, assume there are 20 total pieces of displayed information. Of the 20 pieces, 8 pieces were displayed and selected information and 12 pieces of information were displayed but not selected. The first primitive weighting may be the ratio of the 8 pieces of displayed and selected information to the 20 total pieces of information displayed, or 8/20=0.4, and the second primitive weighting may be the ratio of the 12 pieces of information that were displayed but not selected to the 20 total pieces of information displayed, or 12/20=0.6. The ratios may each be normalized by multiplying each weighting value by 10 to yield 4 as the first primitive weighting for each piece of displayed and selected information and 6 as the second primitive weighting of each piece of displayed but not selected information.

At 208, a first correspondence weighting is assigned to the information category, wherein the first correspondence weighting comprises a preset value. In some embodiments, the same first correspondence weighting is assigned to every information category that is associated with a piece of displayed and selected information. The preset value for the first correspondence weighting may be determined prior to performing process 200. For example, the first correspondence weighting may be 1.

At 210, a second correspondence weighting is assigned to the information category, wherein the second correspondence weighting is determined based at least in part on a number of pieces of displayed but not selected information associated with the information category and a total number of pieces of displayed but not selected information associated with the plurality of pieces of displayed information.

In various embodiments, the same information category may be assigned both a first correspondence weighting if any of its pieces of displayed information was selected and also a second correspondence weighting if any of its pieces of displayed information was not selected.

In some embodiments, it is configured such that the first correspondence weighting value cannot be the same as the second correspondence weighting value. For example, the first correspondence weighting may be preset to a value that the second correspondence value cannot be. For illustrative purposes of describing the first correspondence weighting value and the second correspondence weighting, the following relationship between the first correspondence weighting value and the second correspondence weighting value is used: the second correspondence weighting≤the first correspondence weighting. (Although in a different configuration, the second correspondence weighting≥the first correspondence weighting and the weighting values would be modified accordingly).

Unlike the first correspondence weighting, which is the same for every information category associated with pieces of displayed and selected information, the second correspondence weighting may vary for different information categories associated with pieces of displayed but not selected information. In some embodiments, the second correspondence weighting assigned to a particular information category is determined based on the ratio of the number of pieces of information of the particular category that were displayed but not selected to the total number of pieces of information (across all categories) that were displayed but not selected. In the example where the first correspondence weighting value is 1 and the second correspondence weighting≤the first correspondence weighting, the second correspondence weighting will not exceed 1.

For example, out of 20 total pieces of displayed information, if the total number of pieces of information (across all categories) that was displayed but not selected is 12, and the number of pieces of information associated with only information category A that was displayed but not selected is 6, then the ratio of the number of pieces of information of information category A that were displayed but not selected to the total number of pieces of information (across all categories) that were displayed but not selected is 6/12=0.5, and so the second correspondence weighting assigned to information category A would be 0.5.

At 212, a matching degree is determined for the information category and those of the plurality of pieces of displayed information associated with the information category is based at least in part on the first primitive weighting, the second primitive weighting, the first correspondence weighting associated with the information category, and the second correspondence weighting associated with the information category.

A matching degree is determined for the information category and those of the plurality of pieces of displayed information associated with the information category. The matching degree is based at least in part on the first primitive weighting assigned to each piece of displayed and selected information, the second primitive weighting assigned to each piece of displayed but not selected information, the first correspondence weighting associated with the information category, and the second correspondence weighting associated with the information category.

The following is one example technique of using the above mentioned values to determine the matching degree of the information category: 1) multiply the first primitive weighting(s) assigned to each piece of displayed and selected information by the first correspondence weighting assigned to the information category, and sum all of the products (if there are more than one) to obtain a first value; 2) multiply the second primitive weighting(s) assigned to each piece of information associated with the information category that were displayed but not selected by the second correspondence weighting assigned to the information category, and sum all of the products (if there are more than one) to obtain a second value; 3) determine the matching degree between the information category and those of the plurality of pieces of displayed information associated with the information category based on the sum of the first value and the second value.

Because the matching degree determination as described above takes into account the distinction between information included in an information category that has been displayed and also selected by users and information included in an information category that has been displayed but not selected by users, the matching degree can reflect whether users are actually receptive to the displayed information of an information category that is determined to match the user's interests.

At 214, whether to adjust information to be displayed for the information category is determined based at least in part on the matching degree determined for the information category. In some embodiments, the adjustment of information to be displayed for an information category may be determined based at least in part on the matching degree determined for that information and the subset of pieces of information currently configured to be displayed for that information category. For example, the determined matching degree between an information category and its subset of pieces of information currently configured to be displayed is compared to a predetermined matching degree threshold. If the matching degree of the information category is equal to or above the predetermined matching degree threshold, then it is determined that information to be displayed for the information category does not need to be adjusted. However, if the determined matching degree of the information category is below the predetermined matching degree threshold, then it is determined that information to be displayed for the information category needs to be adjusted. For example, assume that information category A included a total of 40 pieces of information (identified by numbers 1 through 40) and only 20 such pieces of information (pieces 1-20) were currently configured to be displayed and the remaining 20 such pieces (pieces 21-40) were currently configured to not be displayed. In this example, the determined matching degree of information category A to the 20 pieces of information (pieces 1-20) to be displayed is 28%. With the assumption that the predetermined matching degree threshold value is 30%, the determined matching degree of information category A is below the threshold and as such, the displayed information of information category A needs to be adjusted.

In some embodiments, once it is determined that the displayed information of a particular information category is to be adjusted, then at least some of the information that was configured to not be displayed for that information category (non-displayed information) may be used to replace at least some of the information that was configured to be displayed. Returning to the previous example, 10 pieces of information can be selected from the 20 pieces of non-displayed information (pieces 21-30) to replace 10 pieces of information that were currently configured to be displayed but were not selected (pieces 1-10), or all 20 pieces of non-displayed information (pieces 21-40) can be selected to replace all 20 pieces of displayed information currently configured to be displayed (pieces 1-20). In another example, non-displayed pieces of information may be successively selected from the non-displayed information included in the information category to replace information that is currently configured to be displayed. Specifically, each time that it is determined that displayed information is to be adjusted for a particular information category, one piece of non-displayed information may be used to replace one piece of information that is currently configured to be displayed, and after each replacement, a new matching degree between the information category and the newly configured information to be displayed (i.e., the subset of displayed information after the replacement) can be determined based on new user selection action information generated with respect to the replaced displayed information. In some embodiments, the subset of the displayed information for a particular information category that corresponds to the greatest matching degree may be selected to serve as a preferred information set for long-term display for that information category.

Through dynamic adjustment of displayed information based on the matching degree between information categories and their respective displayed information, it is possible to eliminate or replace pieces of displayed information in an information category in which users have less interest as demonstrated by their lack of selection of such displayed information and for which matching degrees to the information category are low, all the while including pieces of information for the information category, which users have more interest in as demonstrated by their willingness to select such information and for which matching degrees to the information category are higher.

Figure 3A:
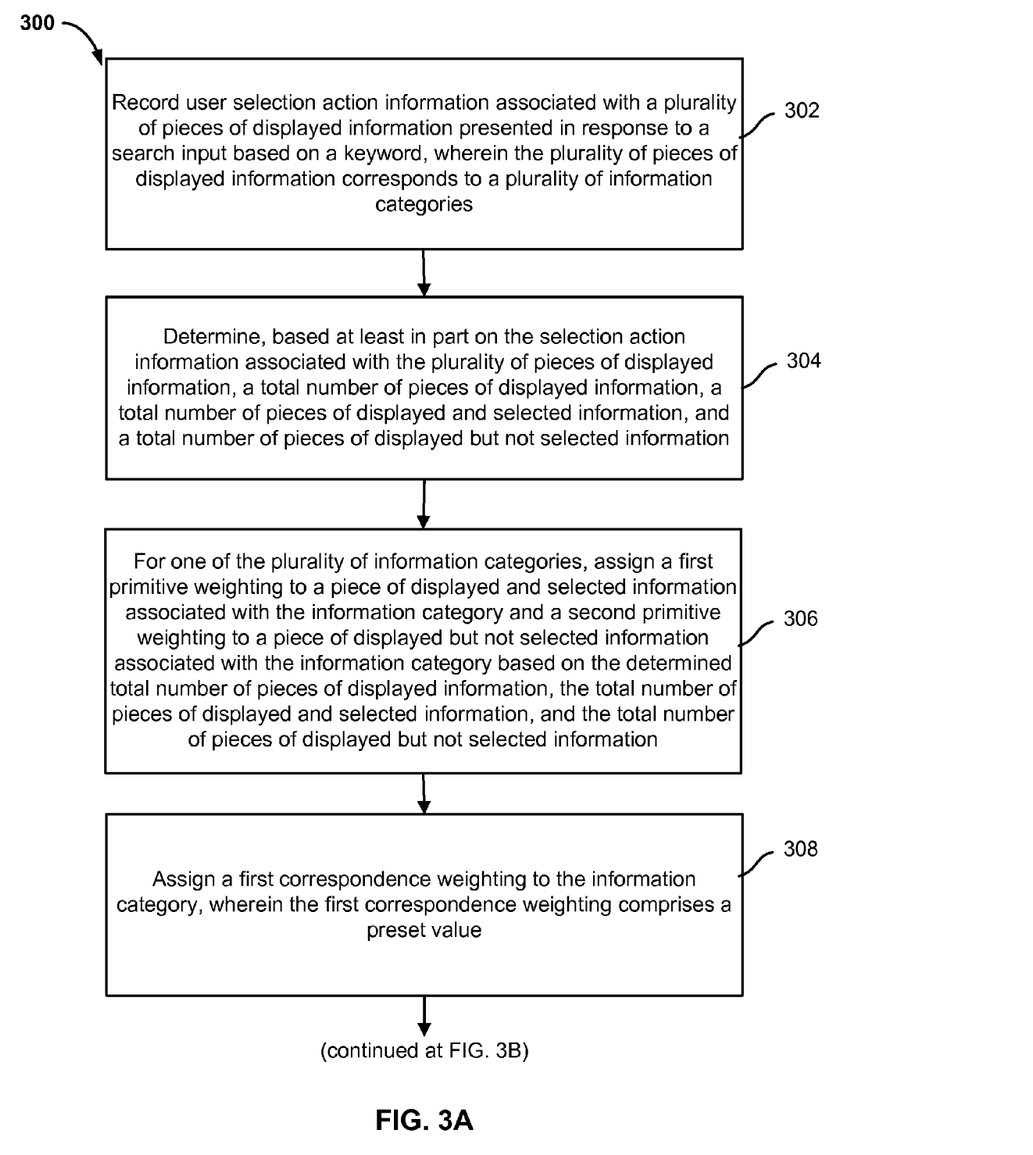
FIGS. 3A and 3B are diagrams showing an example where displayed information is returned in response to a keyword-based search.
Figure 3B:
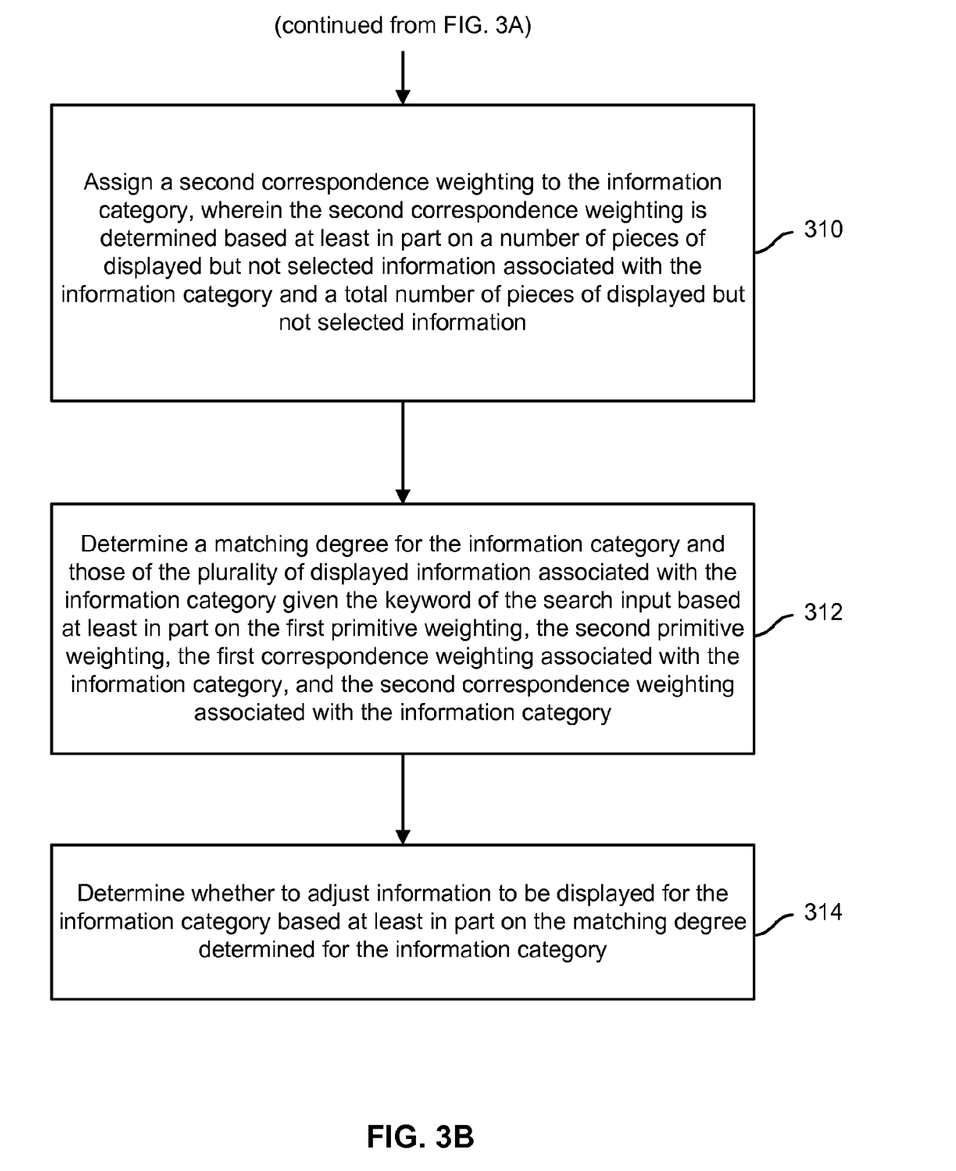

FIGS. 3A and 3B are diagrams showing an example where displayed information is returned in response to a keyword-based search. In some embodiments, process 300 is implemented at system 100. In some embodiments, process 300 is used to implement process 200.

Process 300 may be used to illustrate the determination of a matching degree for an information category in which historical user selection information is associated with information that was displayed in response to keyword-based searches.

At 302, user selection action information associated with a plurality of pieces of displayed information presented in response to a search input based on a keyword is recorded, wherein the plurality of pieces of displayed information corresponds to a plurality of information categories. In response to a user keyword-based search, at least subsets of information included in information categories that correspond to the search keyword are displayed for users. In some embodiments, the subset of pieces of information of a particular information category to be displayed is the subset of information of that category that is designated to be displayed in response to a particular search keyword that matches that category. In some embodiments, selection action information regarding the displayed pieces of information indicate which of the displayed pieces of information returned based on the search keyword were selected by the user (as demonstration of the user's interest in those pieces of information).

At 304, based at least in part on the selection action information associated with the plurality of pieces of displayed information, a total number of pieces of displayed information, a total number of pieces of displayed and selected information, and a total number of pieces of displayed but not selected information are determined. 306-314 are performed for one information category and may be repeated for each information category that is associated with the plurality of pieces of displayed information extracted from the logs:

At 306, for one of the plurality of information categories, a first primitive weighting is assigned to each piece of displayed and selected information associated with the information category and a second primitive weighting is assigned to a piece of displayed but not selected information associated with the information category based on the determined total number of pieces of displayed information, the total number of pieces of displayed and selected information, and the total number of pieces of displayed but not selected information.

In the example, assume that there are 10 total pieces of displayed information, 3 of which have been selected, and 7 of which that have not been selected. 5 of the 10 total pieces of displayed information belonged to information category p_cate1, 2 of the 10 total pieces of displayed information belonged to information category p_cate2, 2 of the 10 total pieces of displayed information belonged to information category p_cate3, and 1 of the 10 total pieces of displayed information belonged to information category p_cate4.

Based on a total number of pieces of displayed information of 10, the total number of pieces of displayed and selected information of 3, and a total number of pieces of displayed but not selected information of 7, the first primitive weighting (denoted as Sctr) assigned to each piece of displayed and selected information is 3/10=0.3 and the second primitive weighting (denoted as Sn) assigned to each piece of displayed but not selected information is 7/10=0.7.

At 308, a first correspondence weighting is assigned to the information category, wherein the first correspondence weighting comprises a preset value.

Returning to the example, assume that the identifiers of the information categories to which the three pieces of displayed and selected information belong are respectively p_cate1, p_cate2, and p_cate3. So each of p_cate1, p_cate2, and p_cate3 is assigned a first correspondence weighting that is a predetermined value of 1. If the first correspondence weighting assigned to the nth information category is represented by Rsctr(kw~p_caten), then Rsctr(kw~p_caten) for n=1, 2, and 3 is represented below by expressions [1], [2], and [3], respectively:

$$Rsctr(kw\sim p\_cate1)=1 \quad [1]$$

$$Rsctr(kw\sim p\_cate2)=1 \quad [2]$$

$$Rsctr(kw\sim p\_cate3)=1 \quad [3]$$

At 310, a second correspondence weighting is assigned to the information category, wherein the second correspondence weighting is determined based at least in part on a number of pieces of displayed but not selected information associated with the information category and a total number of pieces of displayed but not selected information.

Returning to the example, the second correspondence weighting is assigned to each of the information categories associated with the 7 pieces of information that were displayed but not selected. An example technique of determining the second correspondence weighting is as follows:

First, the information categories to which the 7 pieces of information that were displayed but not selected belong are determined. For example, assume that it is determined that of these 7 pieces of information that were displayed but not selected, four pieces of information belong to information category p_cate1, and the other three pieces of information belong to information categories p_cate2, p_cate3, and p_cate4, respectively.

Then, if the second correspondence weighting assigned to the nth information category is represented by Rsn (kw~p_caten) and each is determined to be the number of pieces of information of the nth's information category that was displayed but not selected divided by the total number of pieces of information (across all categories) that was displayed but not selected, then Rsn(kw~p_caten) for n=1, 2, 3, and 4 is represented below by expressions [4], [5], [6], and [7], respectively:

$$Rsn(kw \sim p\_cate1) = \frac{4}{7} = 0.57 \quad [4]$$

$$Rsn(kw \sim p\_cate2) = \frac{1}{7} = 0.14 \quad [5]$$

$$Rsn(kw \sim p\_cate3) = \frac{1}{7} = 0.14 \quad [6]$$

$$Rsn(kw \sim p\_cate4) = \frac{1}{7} = 0.14 \quad [7]$$

At 312, a matching degree is determined for the information category and those of the plurality of displayed information associated with the information category given the keyword of the search input is based at least in part on the first primitive weighting, the second primitive weighting, the first correspondence weighting associated with the information category, and the second correspondence weighting associated with the information category.

In this example, the matching degree of information category n and the subset of information configured to be displayed for information category n are also referred to as the information category weighting. For example, the matching degree for the information displayed for information category n that matches search keyword kwa may be represented as Kwa~p_caten.

Returning to the example, the matching degree Kw1~p_cate1 determined for p_cate1 given the search keyword of Kw1 may be determined by determining a first value of the first primitive weightings and the first correspondence weighting and a second value of the second primitive weightings and the second correspondence weighting and then adding the first and second values together, which is shown in the following expression, expression [8]:

$$\begin{aligned} Kw1 \sim p\_cate1 &= Sctr \times Rsctr(kw \sim p\_cate1) + Sn \times \\ &\quad Rsn(kw \sim p\_cate1) \\ &= 0.3 \times 1 + 0.7 \times 0.57 \\ &= 0.699 \end{aligned} \quad [8]$$

Similarly, the matching degrees of Kw1~p_cate2, Kw1~p_cate3, Kw1~p_cate4 respectively information categories p_cate2, p_cate3, and p_cate4, given the search keyword of Kw1 may be determined using the following expressions of [9], [10], and [11]:

$$Kw1 \sim \text{p\_cate2} = Sctr \times Rsctr(kw \sim \text{p\_cate2}) + Sn \times \quad [9]$$
$$Rsn(kw \sim \text{p\_cate2})$$
$$= 0.3 \times 1 + 0.7 \times 0.14$$
$$= 0.398$$

$$Kw1 \sim \text{p\_cate3} = Sctr \times Rsctr(kw \sim \text{p\_cate3}) + Sn \times \quad [10]$$
$$Rsn(kw \sim \text{p\_cate3})$$
$$= 0.3 \times 1 + 0.7 \times 0.14$$
$$= 0.398$$

$$Kw1 \sim \text{p\_cate4} = Sctr \times Rsctr(kw \sim \text{p\_cate4}) + Sn \times \quad [11]$$
$$Rsn(kw \sim \text{p\_cate4})$$
$$= 0 + 0.7 \times 0.14$$
$$= 0.098$$

As mentioned above, the higher the value of a matching degree of a particular information category, the stronger the correlation between the information category and its current subset of information that is configured to be displayed for that information category. Based on the matching degrees determined above for information categories p_cate1, p_cate2, p_cate3, and p_cate4 for a particular search with keyword Kw1, it appears that information category p_cate1 has the highest matching degree (0.699), followed by information categories p_cate2 (0.398) and p_cate3 (0.398), and finally information category p_cate4 (0.098) in the historical selection information associated with this search.

At 314, whether to adjust information to be displayed for the information category is determined based at least in part on the matching degree determined for the information category. In various embodiments, a predetermined matching degree threshold is designated for one or more information categories. To determine whether to adjust the information to be displayed for information category n retrieved for keyword a, the matching degree (e.g., Kwa~p_caten) is compared against the predetermined matching degree threshold. If the determined matching degree is less than the threshold, then adjustment needs to be performed. However, if the determined matching degree is equal or greater than the threshold, then the information to be displayed for the information category does not need to be adjusted. Returning to the example, assume that the predetermined matching degree threshold is 35%. The matching degrees of information category p_cate1 (0.699), information category p_cate2 (0.398), and information category p_cate3 (0.398) all exceed the threshold so the displayed information does not need to be adjusted for these information categories. However, the matching degree of information category p_cate4 is below the threshold and therefore, the displayed information of information category p_cate4 does need to be adjusted. To adjust the displayed information for information category p_cate4, for example, non-displayed information included in information category p_cate4 may be selected to serve in the subset of pieces of information to be displayed for information category p_cate4 at the subsequent event in which information included in information category p_cate4 is to be displayed. Or, to adjust the displayed information for information category p_cate4, for example, at least some pieces of information are selected from the non-displayed information included in information category p_cate4, and the selected information can be ranked ahead of the previously displayed information of information category p_cate4. In this example, only 1 piece of information was configured to be displayed for information category p_cate4 and it was not selected. After the adjustment, a different piece of information belonging to information category p_cate4 that was previously not designated to be displayed is selected to be displayed for information category p_cate4 at the subsequent event in which information is to be displayed from information category p_cate4.

While 302-314 are performed for the information displayed in response to one search for a particular keyword, in some embodiments, user selection action information associated with pieces of displayed information presented in response to multiple search inputs with the same keyword (or multiple keywords) within a particular time period is recorded. For example, the time period may be 24 hours or 30 days and the user selection action information may be recorded by one or more servers. Generally, the longer this designated time period is, the greater the volume of information recorded and the more accurate the matching degree(s) determined based on the recorded information will be.

For example, assume that user selection action information associated with pieces of displayed information presented in response to m searches performed with respect to the same keyword Kwa within a 24-hour day has been recorded. Then, 302-314 may be performed for each of the M searches to obtain the matching degrees corresponding to the information categories for each search. Then, the matching degrees determined for each of the M searches may be averaged for a particular information category to obtain the matching degree for that information category across multiple searches. For example, for information category n, expression [12] below may be further used to determine the mean Dn(Kwa~p_caten) of m matching degrees for information category n corresponding to the M searches, where j represents the jth's of M searches for keyword Kwa, $Kwa_j$~p_caten represents the determined matching degree of information category n for the jth's search for keyword Kwa, and where $Rsctr_j$(Kwa~p_caten) and $Rsn_j$(Kwa~p_caten) respectively represent the first and second correspondence weightings for the jth's of M searches for keyword Kwa.

$$Dn(kwa \sim \text{p\_caten}) = \text{avg}\left(\sum_{j=1}^{m} Kwa_j \sim \text{p\_caten}\right) = \quad [12]$$
$$\text{avg}\left(\sum_{j=1}^{m} Sctr \times Rsctr_j(Kwa \sim \text{p\_caten}) + Sn \times Rsn_j(Kwa \sim \text{p\_caten})\right)$$

The greater the average matching degree $Dn(Kwa_j \sim \text{p\_caten})$ is, the greater the correlation between the information category n and its displayed information across M searches for keyword Kwa.

In some embodiments, the average matching degree is determined for information category n and its displayed information across d days. For example, d may be 10 or 30 days. Suppose that the mean matching degree on day i computed in accordance with expression [12] above is recorded as $Dn_i$(Kwa~p_caten). Then for information category n, $Dn_i$(Kwa~p_caten) may be computed and obtained d times. Then, Skweightdate (Kwa~p_caten) represents the average matching degree over d days and may be represented using expression [13] below:

$$Skweightdate(Kwa \sim \text{p\_caten}) = \text{avg}\left(\sum_{i=1}^{d} Dn_i(Kwa \sim \text{p\_caten})\right) \quad [13]$$

The greater the average matching degree Skweightdate (Kwa~p_caten) is, the greater the correlation between the information category n and its displayed information is across searching over d days.

Whereas process 300 shows an example of determining matching degrees for information categories based on information displayed in response to keyword searches, matching degrees may also be determined for information displayed in response to other types of determination to display information (e.g., product information) from different information categories. For example, if it is known that user Alice is interested in products of category Y and category Z (e.g., based on the user's historical browsing histories), then information included in the categories of Y and Z may be displayed to user Alice in a section of recommended products as Alice is browsing at a shopping website.

Figure 4:
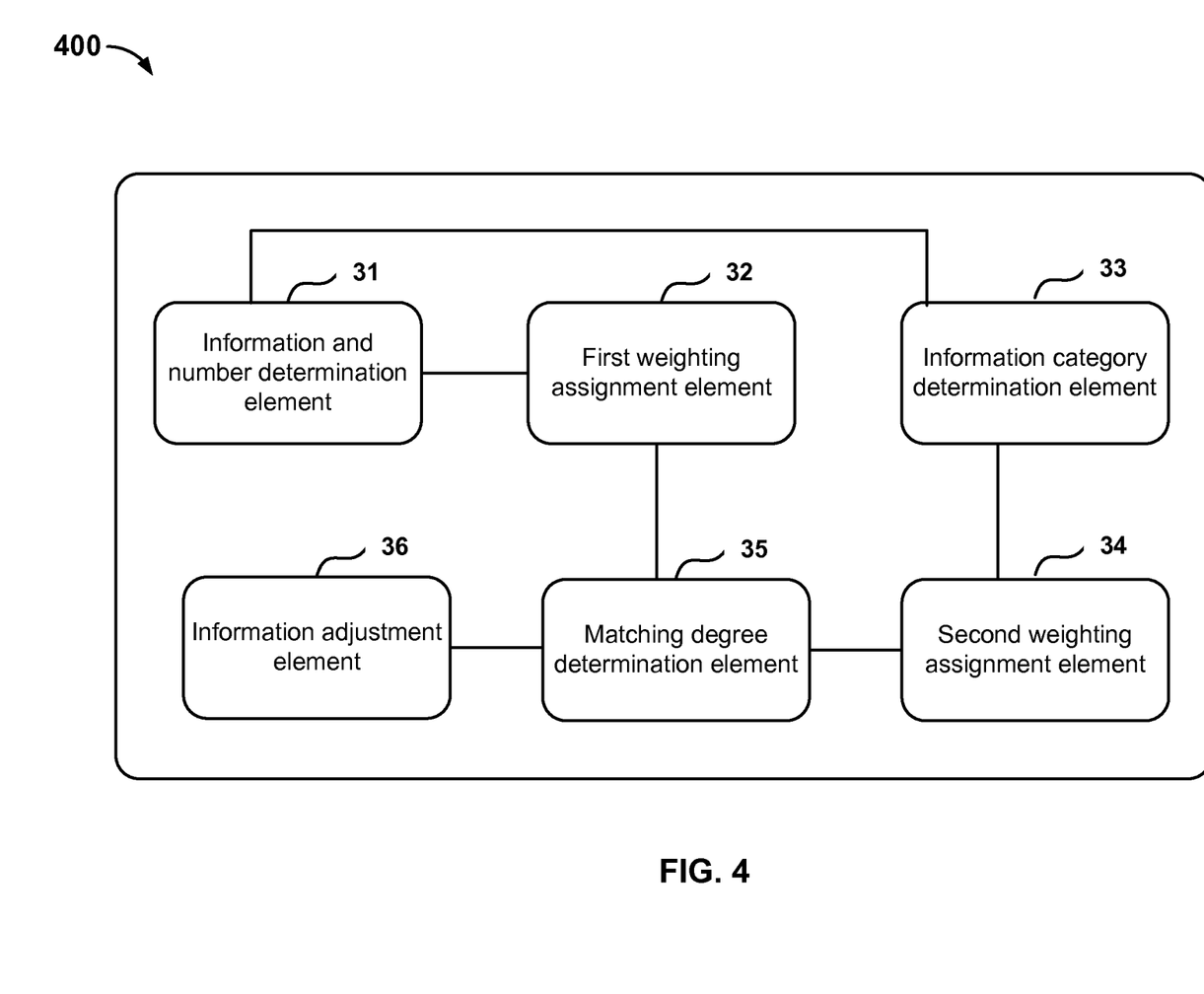
FIG. 4 is a diagram showing an embodiment of a system for determining matching degrees of information and information categories.

FIG. 4 is a diagram showing an embodiment of a system for determining matching degrees of information and information categories. System 400 includes information and number determination element 31, first weighting assignment element 32, information category determination element 33, second weighting assignment element 34, matching degree determination element 35, and information adjustment element 36.

The elements can be implemented as software components executing on one or more processors, as hardware such as programmable logic devices and/or Application Specific Integrated Circuits designed to perform certain functions, or a combination thereof. In some embodiments, the elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The elements may be implemented on a single device or distributed across multiple devices.

Information and number determination element 31 is configured to determine information that was displayed and selected and information that was displayed but not selected included in the displayed information based on historical user selection action information. Information and number determination element 31 is also configured to determine the total number of pieces of information that was displayed but not selected.

First weighting assignment element 32 is configured to assign a first primitive weighting to each piece of displayed and selected information as determined by information and number determination element 31, to assign a second primitive weighting to each piece of information that was displayed but not selected as determined by information and number determination element 31, and to separately assign a first correspondence weighting to each information category to which the displayed and selected information as determined by the information and number determination element 31 belongs.

Information category determination element 33 is configured to determine the information categories to which each piece of information that was displayed but not selected as determined by information and number determination element 31 belongs.

Second weighting assignment element 34 is configured to determine for each information category to which information that was displayed but not selected as determined by information category determination element 33, a first number of pieces of information of the category that was displayed but not selected. Then second weighting assignment element 34 is configured to determine a second correspondence weighting to each information category to which information that was displayed but not selected belongs by dividing the first number of pieces of information of the category that was displayed but not selected by the total number of pieces of information that was displayed but not selected.

Matching degree determination element 35 is configured to, for any information category to which the displayed information belongs, determine which of the displayed pieces of information of that category was selected and which of the information that was displayed but not selected, and based on the first primitive weighting assigned to the displayed and selected information included in the information category, the second primitive weighting assigned to the information that was displayed but not selected included in the information category, and the first correspondence weighting assigned to the information category, and the second correspondence weighting assigned to the information category to determine the matching degree between the information category and its subset of pieces of information that was displayed.

Information adjustment element 36 is configured to, for any information category to which the displayed information belongs, adjust the displayed information included in the information category based on the matching degree between the information category and its displayed information as determined by matching degree determination element 35.

In some embodiments, first weighting assignment element 32 is further configured to include:

A total number determination module configured to determine the total number of pieces of displayed and selected information and the total number of pieces of information that was displayed but not selected within the displayed information.

A first assignment module configured to determine first primitive weightings and assign them to each piece of displayed and selected information. The first assignment module is configured to determine a first primitive weighting based on the total number of pieces of displayed information and the total number of pieces of displayed and selected information as determined by the total number determination module.

A second assignment module configured to determine second primitive weightings and assign them to each piece of information that was displayed but not selected. The second assignment module is configured to determine a second primitive weighting based on the total number of pieces of displayed information and the total number of pieces of information that was displayed but not selected as determined by the total number determination module.

A third assignment module is configured to separately assign a first correspondence weighting to each information category to which displayed and selected information belongs, as determined by the information and number determination element.

In some embodiments, matching degree determination element 35 is further configured to include:

A first sum value determination module is configured to, for any information category to which the displayed information belongs, execute the operations to separately multiply the first primitive weightings assigned to each piece of displayed and selected information included in the category by the first correspondence weighting assigned to the information category, and to sum all of the products (if there is more than one such product), to obtain a first value.

A second sum value determination module is configured to, for any information category to which the displayed information belongs, execute the operations to separately multiply the second primitive weightings assigned to each piece of information that was displayed but not selected in the information category by the second correspondence weighting assigned to the information category, and to sum all of the products (if there is more than one such product), to obtain a second value.

A matching degree determination module is configured to determine the matching degree between the information category and its displayed information, based on the sum of the first value and the second value as determined by the first sum value determination module and the second sum value determination module.

In some embodiments, information adjustment element 36 may be configured to further include: a judgment module that is configured to, for any information category to which the displayed information belongs, determine as to whether the matching degree between the information category and its displayed information is below a predetermined matching degree threshold; a selection module that is configured to, when the determination result obtained by the judgment module is affirmative, select information from the non-displayed information included in the information category; and an updating module that is configured to update the displayed information included in the information category using the information selected by the selection module.

Obviously, a person skilled in the art can modify and vary the present application without departing from the spirit and scope of the present application. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining matching degrees of information categories and displayed information, comprising:
   one or more processors configured to:
      retrieve historical user selection action information associated with a plurality of pieces of displayed information corresponding to a plurality of information categories;
      identify those of the plurality of pieces of displayed information that comprise pieces of displayed and selected information and those of the plurality of pieces of displayed information that comprise pieces of displayed but not selected information based on the historical user selection action information; and
      for one of the plurality of information categories:
         assign a first primitive weighting to each piece of displayed and selected information associated with the information category and a second primitive weighting to each piece of displayed but not selected information associated with the information category;
         assign a first correspondence weighting to the information category, wherein the first correspondence weighting comprises a preset value;
         assign a second correspondence weighting to the information category, wherein the second correspondence weighting is determined based at least in part on a number of pieces of displayed but not selected information associated with the information category and a total number of pieces of displayed but not selected information associated with the plurality of pieces of displayed information;
         determine a matching degree for the information category and those of the plurality of pieces of displayed information associated with the information category based at least in part on the first primitive weighting, the second primitive weighting, the first correspondence weighting associated with the information category, and the second correspondence weighting associated with the information category; and
         determine whether to adjust information to be displayed for the information category based at least in part on the matching degree determined for the information category; and
   one or more memories coupled to the one or more processors and configured to provide the one or more processors with instructions.

2. The system of claim 1, wherein the first primitive weighting is determined as a ratio of a total number of pieces of displayed and selected information from the plurality of pieces of displayed information to a total number of pieces of information included in the plurality of pieces of displayed information.

3. The system of claim 1, wherein the second primitive weighting is determined as a ratio of the total number of pieces of displayed but not selected information from the plurality of pieces of displayed information to a total number of pieces of information included in the plurality of pieces of displayed information.

4. The system of claim 1, wherein the second correspondence weighting associated with the information category is determined as a ratio of the number of pieces of displayed but not selected information associated with the information category to the total number of pieces of displayed but not selected information included in the plurality of pieces of displayed information.

5. The system of claim 1, wherein the matching degree for the information category is determined based at least in part on multiplying the first primitive weighting and the first correspondence weighting to generate a first value, multiplying the second primitive weighting and the second correspondence weighting to generate a second value, and adding together the first value and the second value.

6. The system of claim 1, wherein to determine whether to adjust information to be displayed for the information category includes to compare the matching degree against a predetermined matching degree threshold, and in the event that the matching degree is below the threshold, adjusting the information to be displayed for the information category.

7. The system of claim 6, wherein adjusting the information to be displayed for the information category includes replacing at least one piece of previously displayed information included in the information category by at least one piece of previously not displayed information included in the information category.

8. The system of claim 7, wherein the adjusted information to be displayed for the information category is displayed during a subsequent event in which information associated with the information category is to be displayed.

9. The system of claim 1, wherein at least a plurality of displayed information was presented in response to a search input based on a keyword.

10. The system of claim 1, wherein the one or more processors are further configured to:
   for another of the plurality of information categories:

assign a first primitive weighting to each piece of displayed and selected information associated with the information category and a second primitive weighting to each piece of displayed but not selected information associated with the information category;

assign a first correspondence weighting to the information category, wherein the first correspondence weighting comprises a preset value;

assign a second correspondence weighting to the information category, wherein the second correspondence weighting is determined based at least in part on a number of pieces of displayed but not selected information associated with the information category and a total number of pieces of displayed but not selected information associated with the plurality of pieces of displayed information;

determine a matching degree for the information category and those of the plurality of pieces of displayed information associated with the information category based at least in part on the first primitive weighting, the second primitive weighting, the first correspondence weighting associated with the information category, and the second correspondence weighting associated with the information category; and determine whether to adjust information to be displayed for the information category based at least in part on the matching degree determined for the information category.

11. A method for determining matching degrees of information categories and displayed information, comprising:

retrieving historical user selection action information associated with a plurality of pieces of displayed information corresponding to a plurality of information categories;

identifying those of the plurality of pieces of displayed information that comprise pieces of displayed and selected information and those of the plurality of pieces of displayed information that comprise pieces of displayed but not selected information based on the historical user selection action information; and for one of the plurality of information categories:

assigning a first primitive weighting to each piece of displayed and selected information associated with the information category and a second primitive weighting to each piece of displayed but not selected information associated with the information category;

assigning a first correspondence weighting to the information category, wherein the first correspondence weighting comprises a preset value;

assigning a second correspondence weighting to the information category, wherein the second correspondence weighting is determined based at least in part on a number of pieces of displayed but not selected information associated with the information category and a total number of pieces of displayed but not selected information associated with the plurality of pieces of displayed information;

determining a matching degree for the information category and those of the plurality of pieces of displayed information associated with the information category based at least in part on the first primitive weighting, the second primitive weighting, the first correspondence weighting associated with the information category, and the second correspondence weighting associated with the information category; and determining whether to adjust information to be displayed for the information category based at least in part on the matching degree determined for the information category.

12. The method of claim 11, wherein the first primitive weighting is determined as a ratio of a total number of pieces of displayed and selected information from the plurality of pieces of displayed information to a total number of pieces of information included in the plurality of pieces of displayed information.

13. The method of claim 11, wherein the second primitive weighting is determined as a ratio of the total number of pieces of displayed but not selected information from the plurality of pieces of displayed information to a total number of pieces of information included in the plurality of pieces of displayed information.

14. The method of claim 11, wherein the second correspondence weighting associated with the information category is determined as a ratio of the number of pieces of displayed but not selected information associated with the information category to the total number of pieces of displayed but not selected information included in the plurality of pieces of displayed information.

15. The method of claim 11 wherein the matching degree for the information category is determined based at least in part on multiplying the first primitive weighting and the first correspondence weighting to generate a first value, multiplying the second primitive weighting and the second correspondence weighting to generate a second value, and adding together the first value and the second value.

16. The method of claim 11, wherein determining whether to adjust information to be displayed for the information category includes to compare the matching degree against a predetermined matching degree threshold, and in the event that the matching degree is below the threshold, adjusting the information to be displayed for the information category.

17. The method of claim 16, wherein adjusting the information to be displayed for the information category includes replacing at least one piece of previously displayed information included in the information category by at least one piece of previously not displayed information included in the information category.

18. The method of claim 17, wherein the adjusted information to be displayed for the information category is displayed during a subsequent event in which information associated with the information category is to be displayed.

19. A computer program product for determining matching degrees of information categories and displayed information, the computer program product being embodied in a computer readable storage medium and comprising computer instructions for:

retrieving historical user selection action information associated with a plurality of pieces of displayed information corresponding to a plurality of information categories;

identifying those of the plurality of pieces of displayed information that comprise pieces of displayed and selected information and those of the plurality of pieces of displayed information that comprise pieces of displayed but not selected information based on the historical user selection action information; and for one of the plurality of information categories:

assigning a first primitive weighting to each piece of displayed and selected information associated with the information category and a second primitive weighting to each piece of displayed but not selected information associated with the information category;

assigning a first correspondence weighting to the information category, wherein the first correspondence weighting comprises a preset value;

assigning a second correspondence weighting to the information category, wherein the second correspondence weighting is determined based at least in part on a number of pieces of displayed but not selected information associated with the information category and a total number of pieces of displayed but not selected information associated with the plurality of pieces of displayed information;

determining a matching degree for the information category and those of the plurality of pieces of displayed information associated with the information category based at least in part on the first primitive weighting, the second primitive weighting, the first correspondence weighting associated with the information category, and the second correspondence weighting associated with the information category; and determining whether to adjust information to be displayed for the information category based at least in part on the matching degree determined for the information category.

* * * * *